(12) United States Patent
Ouni et al.

(10) Patent No.: US 10,290,138 B2
(45) Date of Patent: May 14, 2019

(54) IMAGE PROCESSING DEVICE

(71) Applicant: Universite De Lorraine, Nancy (FR)

(72) Inventors: Slim Ouni, Ludres (FR); Guillaume Gris, Niderbronn les Bains (FR)

(73) Assignee: UNIVERSITE DE LORRAINE, Nancy (FR)

( * ) Notice: Subject to any disclaimer, the term of this patent is extended or adjusted under 35 U.S.C. 154(b) by 0 days.

(21) Appl. No.: 15/557,714

(22) PCT Filed: Mar. 10, 2016

(86) PCT No.: PCT/FR2016/050547
§ 371 (c)(1),
(2) Date: Sep. 12, 2017

(87) PCT Pub. No.: WO2016/142632
PCT Pub. Date: Sep. 15, 2016

(65) Prior Publication Data
US 2018/0061109 A1 Mar. 1, 2018

(30) Foreign Application Priority Data

Mar. 12, 2015 (FR) ...................... 15 52058

(51) Int. Cl.
G06T 13/20 (2011.01)
G06T 13/40 (2011.01)
G10L 21/10 (2013.01)

(52) U.S. Cl.
CPC ............ *G06T 13/40* (2013.01); *G06T 13/205* (2013.01); *G10L 21/10* (2013.01); *G10L 2021/105* (2013.01)

(58) Field of Classification Search
None
See application file for complete search history.

(56) References Cited

U.S. PATENT DOCUMENTS

| 2003/0160791 A1* | 8/2003 | Breton | ................... G06T 13/40 |
| | | | 345/473 |
| 2005/0057569 A1* | 3/2005 | Berger | ................... G06T 13/40 |
| | | | 345/473 |

(Continued)

FOREIGN PATENT DOCUMENTS

| EP | 0710929 A2 | 5/1996 |
| JP | 2007-299300 A | 11/2007 |

OTHER PUBLICATIONS

King et al. "Creating Speech-Synchronized Animation", IEEE Transactions on Visualization and Computer Graphics, vol. 11, No. 3, May/Jun. 2005.*

(Continued)

*Primary Examiner* — Kee M Tung
*Assistant Examiner* — Yanna Wu
(74) *Attorney, Agent, or Firm* — Maynard Cooper & Gale, P.C.; Brian T. Sattizahn

(57) ABSTRACT

Device comprising a memory (2) storing sound data, three-dimensional surface data, and a plurality of control data sets which represent control points defined by data of coordinates which are associated with sound data, and a processor (4) which, on the basis of first and second successive sound data, and of first three-dimensional surface data, selects the control data sets associated with the first and second sound data, and defines second three-dimensional surface data by applying a displacement to each point. The displacement of a given point is calculated as the sum of displacement vectors calculated for each control point on the basis of the sum of first and second vectors, weighted by the ratio between the result of a function with two variables exhibiting a zero limit at infinity applied to the given point and to the control point and the sum of the result of this function applied to the point on the one hand and to each of the control points on the other hand. The first vector represents (Continued)

Figure 1:
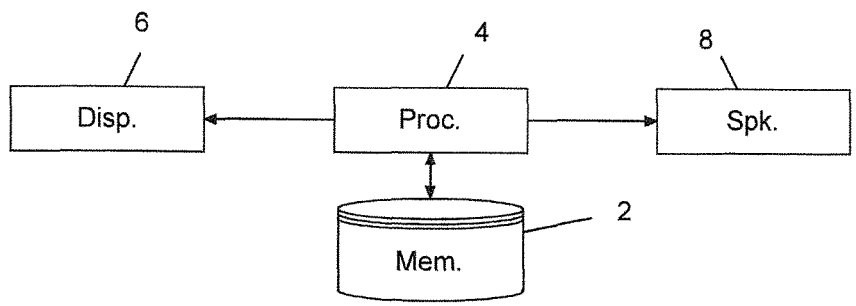

the displacement of the control point between the first and the second second sound data. The second vector corresponds to the difference between the data of coordinates of the point and the data of coordinates of the control point in the first sound data, multiplied by a coefficient dependent on the gradient of the first vector.

10 Claims, 2 Drawing Sheets

(56) References Cited

U.S. PATENT DOCUMENTS

2010/0057455 A1* 3/2010 Kim .............................. 704/235
2010/0259538 A1 10/2010 Park et al.

OTHER PUBLICATIONS

Akimoto et al. "Automatic Creation of 3D Facial Models" IEEE Computer Graphics & Application 1993.*
Changwei, Luo, et al., "Realtime Speech-Driven Facial Animation Using Gaussian Mixture Models", 2013 IEEE International Conference on Multimedia and Expo (ICME), Jul. 14, 2014, pp. 1-6.
Huang, Ding, et al., "NURBS Curve Controlled Modelling for Facial Animation", Computers and Graphics, Elsevier, GB, vol. 27, No. 3, Jun. 1, 2003, pp. 373-385.
Musti, Utpala, et al., "Facial 3D Shape Estimation from Images for Visual Speech Animation", 22nd International Conference on Pattern Recognition, IEEE Computer Society, US, Aug. 24, 2014, pp. 40-45.
Feldhoffer, Gergely, et al., "An Efficient Voice Driven Face Animation Method for Cyber Telepresence Applications", 2nd International Symposium on Applied Sciences in Biomedical and Communication Technologies, IEEE, Nov. 24, 2009, pp. 1-6.

* cited by examiner

IMAGE PROCESSING DEVICE

The invention relates to the field of image processing and in particular to the generation of automatic voice- and/or sound-synchronized animations. More particularly, the invention relates to realistic facial animation.

The field of speech-synchronized facial animation is an area that has experienced numerous developments as the resolution of displays has increased.

Indeed, in the early days, an 8-bit or 16-bit display allowed only one or two pixels for creating the mouth of a character in most cases. The question of facial synchronization with a text was then much more easily resolved since in general audio tracks only contained music in midi format, and dialog was presented in the form of text displayed on the screen.

When hardware capabilities increased, it became possible to record the dialog in the form of reproduced sound files, and the question of synchronization with the face of the character gradually came to the fore.

This problem was solved by the digitization of facial expressions, by using control points used for animating the entire face during reproduction. But with resolution constantly increasing, it was necessary to increase the number of control points in parallel. Indeed, for a given number of control points, the animation is much more credible if the resolution is lower. For example, if the same number of control points is used for an SD resolution as for an HD resolution, the animation will be much more credible in the first case than in the second.

With the arrival of Ultra HD, it is no longer possible to increase the number of control points to obtain a sufficiently realistic animation without being significantly penalized in terms of storage and video power to be developed. In addition, acquiring an ever greater number of control points requires using new higher resolution cameras, which is expensive.

The invention will improve the situation.

To this end, the invention provides an image processing device comprising a memory storing sound data, three-dimensional surface data, and a plurality of control data sets, each control data set representing a plurality of control points defined by coordinate data and being associated with sound data, and a processor arranged, on the basis of first and second successive sound data, and of first three-dimensional surface data, for selecting control data sets associated with the first and second sound data, and for defining second three-dimensional surface data by applying a displacement to each point of the first three-dimensional surface data.

The displacement of a given point of the first three-dimensional surface data is calculated as the sum of displacement vectors calculated for each control point of the control data set associated with the first sound data, each displacement vector calculated for a given control point being calculated on the basis of the sum of a first vector and a second vector, which sum is weighted by a weight calculated as the ratio between the result of a two variable function having a zero limit at infinity applied to the given point and to the given control point and the sum of the result of this function applied to the given point on the one hand and to each of the control points of the control data set associated with the first sound data on the other hand.

The first vector represents the displacement of the position defined by the coordinate data of the given control point in the control data set associated with the first data to the position defined by the coordinate data of the given control point in the control data set associated with the second sound data, and the second vector corresponds to the difference between the coordinate data of the given point and the coordinate data of the given control point in the control data set associated with the first sound data, multiplied by a coefficient dependent on the gradient of the first vector.

This device is particularly advantageous since it makes it possible to obtain an animation the quality of which is satisfactory even for a face in very high resolution, while using a reduced number of control points.

In various particular embodiments, the device may have one or a combination of several of the following characteristics:
    the two variable function associates with two points a mathematical distance applied to these two points raised to a chosen power,
    the mathematical distance is chosen from a group comprising the Euclidean distance, the quadratic distance and the geodesic distance,
    the chosen power is less than or equal to −1,
    the coefficient dependent on the gradient of the first vector is equal to the gradient of the first vector,
    the coefficient dependent on the gradient of the first vector is equal to the gradient of the first vector divided by a value proportional to the distance between the given point and the given control point,
    the proportional value corresponds to the ratio of the distance between the given point and the given control point by a deformation constant greater than 1, this ratio being raised to a chosen power plus one,
    the chosen power is greater than or equal to 1,
    the ratio between the number of three-dimensional surface data points and the number of points in a control data set is greater than 50.

The invention also relates to a computer program product capable of cooperating with a computer for implementing the above device.

Figure 2:
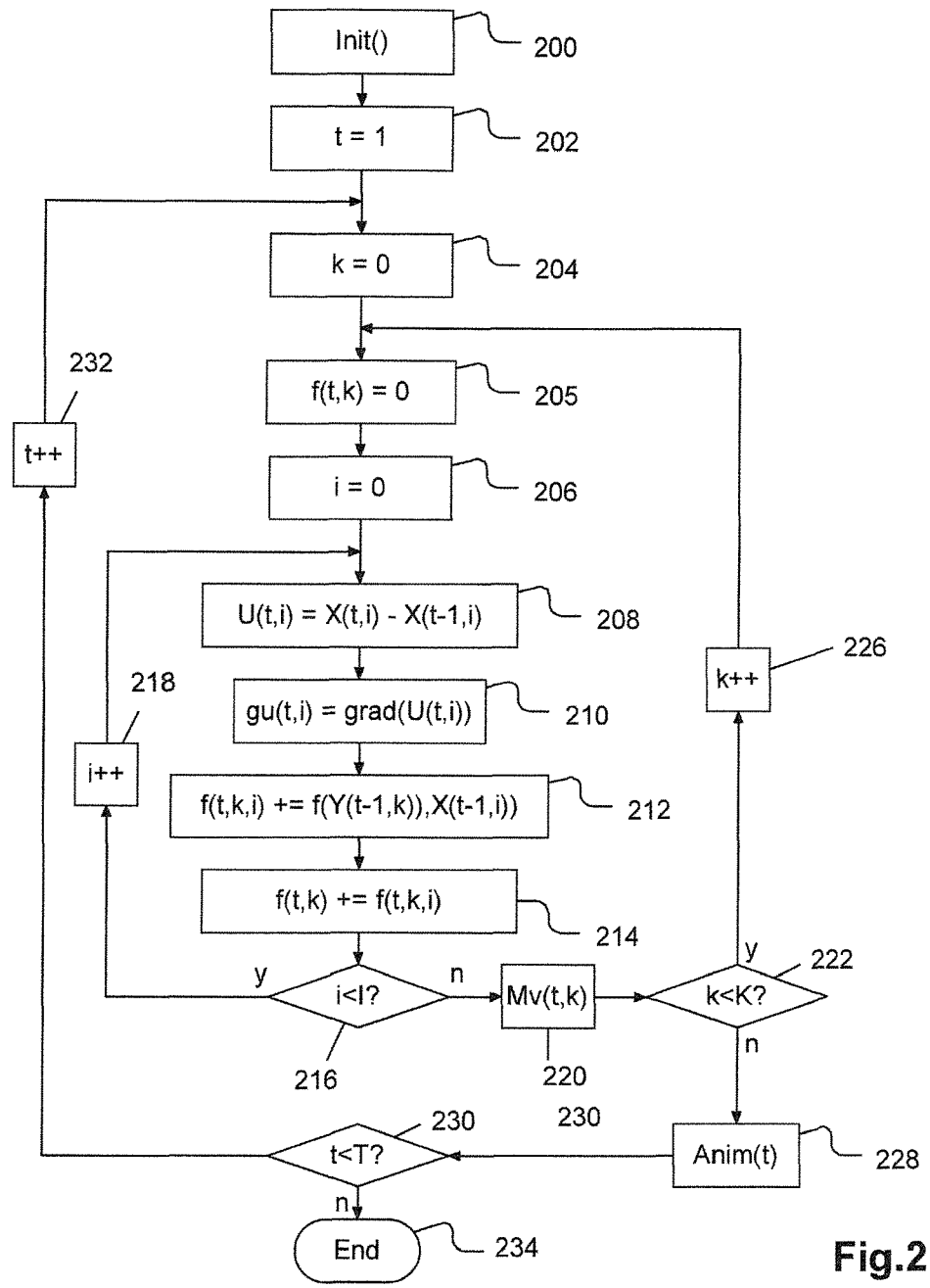
Figure 3:
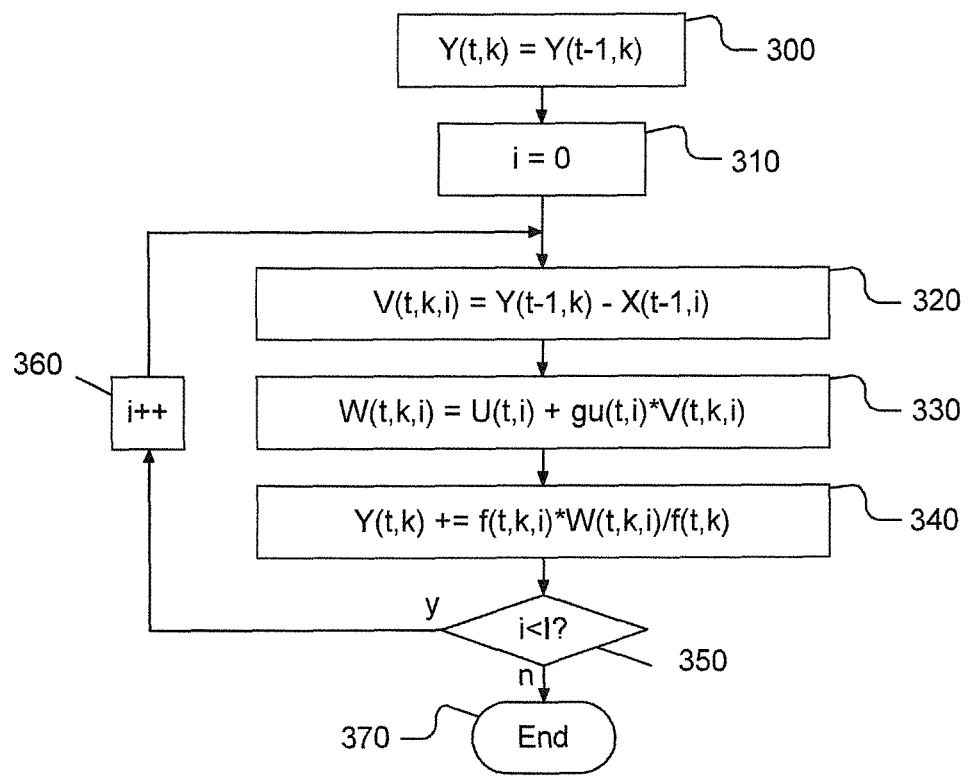

Other features and advantages of the invention will better appear on reading the following description, derived from illustrative and non-restrictive examples, and derived from the drawings in which:

FIG. 1 represents a generic diagram of a device according to the invention, and FIG. 2 represents an embodiment of a function implemented by the device in FIG. 1, and FIG. 3 represents an embodiment of a function implemented in FIG. 2.

The present description may involve elements that are liable to be protected under author's rights and/or copyright. The rights holder has no objection to the faithful reproduction of the present patent document or its description by anyone, as it appears in the official records. For the rest, it reserves its rights in full.

The following drawings and description basically contain elements of a certain nature. They may therefore not only be used for the better understanding of the present invention, but also contribute to its definition, where appropriate.

FIG. 1 represents a generic diagram of a simulation device according to the invention. The device includes a memory 2, a processor 4, a display 6 and a speaker 8.

As part of the invention, the memory 2 may be any type of data storage appropriate for receiving digital data: hard disk, flash memory solid state disk (SSD), flash memory in any form, random access memory, magnetic disk, storage distributed locally or in the cloud, etc. The data calculated by the device may be stored in any type of memory similar to the memory 2, or on the latter. These data may be deleted or retained after the device has performed its tasks.

The data stored in the memory 2 are of several natures. Thus, the memory 2 receives sound data, three-dimensional surface data, control data, and it may also receive intermediate data used in the calculations performed by the processor 4.

The sound data are not necessarily audio data. Thus, the sound data may be identifiers associated with audio data, or with textual data representing the sound that is to be represented by the animation, or even audio or textual data or any other type of data that make it possible to associate the animation which is produced with a corresponding set of sounds.

The three-dimensional surface data are data making it possible to define a surface that is to be animated synchronously with the sound data. These data may be of any nature so long as they make it possible to fully describe each point of the surface that is to be animated. They may therefore comprise identifier data and a plurality of data points of this surface. The point data may be, for example, coordinate data. Some portions or the entire surface may also be defined by equations connecting the points. The coordinate data may also be defined in absolute or relative terms, with respect to a reference point on the surface, for example.

The control data are assembled into sets. These sets contain data which designate coordinates of "control" points. These control points are taken on the three-dimensional surface, and serve as a reference with respect to sound data. Thus, each control data set defines the location of the control points of the three-dimensional surface for sound data with which the control data set is associated.

The processor 4 may be any processor suitable for calculating an animation synchronized with a sound reproduction in audio or textual form. It may be implemented in any known way, in the form of a microprocessor for a personal computer, an FPGA or SoC ("system on chip") dedicated chip, a calculation resource on a grid, a microcontroller, or any other form appropriate for supplying the necessary calculating power for the implementation described below.

The display 6 may be any type of display that can be connected to the processor 4 for a visual reproduction of the animation of a face (or of another surface) synchronously with sound data, and the sound data when these are of a textual nature. The speaker 8 may be any type of device suitable for the audio reproduction of audio type sound data.

FIG. 2 represents an example of implementation of a function by the device for animating a three-dimensional surface synchronously with sound data.

In a first operation 200, the processor 4 executes a function Init( ). The function of the Init( ) function is the initialization of the animation function, i.e. the retrieval of the successive sound data, three-dimensional surface data and control data associated with the sound data from the memory 2.

According to the variants, and as described above, the sound data may be textual or audio, and may optionally be extracted from other data. In the example described here, the three-dimensional surface data and the control data associated with the sound data which are the first in the sequence of sound data substantially correspond, so that the points of the first control data have coordinates that are substantially identical to the coordinates of these points in the three-dimensional surface data. Thus, the three-dimensional surface data have a good correspondence with the first control data.

As a variant, the memory 2 may comprise multiple three-dimensional surface data for a given three-dimensional surface, and the processor 4 executes a function for choosing those of these data that best correspond to the first control data. This may be done in various ways, e.g. by manual designation, by remote optimization, or by application of a Gaussian noise and determination of a local minimum, or other.

Several loops then begin. These loops are aimed at calculating, for each point of the three-dimensional surface data, a displacement which is the sum of displacement vectors calculated on the basis of the point of the current surface data and of each of the control points of the control data.

Thus, in an operation 202, the animation function begins by initializing an index t designating the position of the sound data in the sequence of sound data, then in an operation 204, an index k is initialized for scanning the set of three-dimensional surface data points, and in an operation 206, an index i is initialized for scanning the control points. In the example described here, the sequence of sound data comprises T elements, the three-dimensional surface data comprise K points, and the control data comprise I points. In what follows, the control data points are designated by the letter X, and the three-dimensional surface data points are designated by the letter Y. A summation variable f(t,k) is also initialized to 0 in an operation 205, between the operations 204 and 206. This variable will be described below.

The indices t, k and i define three nested loops. The first loop, based on the index i, will make it possible to calculate the elements needed to calculate the displacement of a point of the three-dimensional surface data of index k, for the instant of index t. The second loop, based on the index k, will make it possible to repeat the calculation of the first loop of index i, for each point of the three-dimensional surface data. Finally, the third loop, based on the index t, will make it possible to repeat the calculation of the second loop of index k, for each instant of the successive sound data.

The first loop begins in an operation 208 by calculating a vector U(t,i) which corresponds to the displacement of the control point of index i between the successive instants designated by the indices t−1 and t. For this, the vector U(t,i) is calculated as the difference of the coordinate data of the control point X(t,i) associated with the control point of index i in the control data associated with the sound data of index t, and of the coordinate data of the control point X(t−1,i) associated with the control point of index i in the control data associated with the sound data of index t−1.

Then, in an operation 210, a scalar gu(t,i) is calculated by a function grade. The scalar gu(t,i) is a coefficient dependent on the gradient of the vector U(t,i). In a first variant, the function grad( ) calculates the gradient of the vector U(t,i). In a second variant, the function grad( ) calculates the gradient of the vector U(t,i), and divides it by a coefficient proportional to the distance between the control point X(t−1,i) and the current point of the three-dimensional surface data Y(t−1,k). This second variant is aimed at avoiding a divergence when the points Y(t−1,k) and X(t−1,i) are very far apart.

Then, in an operation 212, a function f( ) is applied to the points Y(t−1,k) and X(t−1,i), in order to calculate a first part of a weighting coefficient. In the example described here, the function f( ) calculates the inverse of the distance between the points Y(t−1,k) and X(t−1,i) squared. It should be noted that the word "distance" must be understood in the mathematical sense of the term. According to the variants, the distance adopted may be the quadratic distance, the Euclidean distance, or a distance that reflects the topology of the three-dimensional surface such as the geodesic distance, a distance derived from the geodesic distance or another appropriate related distance. In general, the function f( ) is chosen so that it forms a decreasing continuous function the limit of which is zero at infinity.

In an operation 214, the summation variable f(t,k) is updated by adding thereto the value f(t,k,i) determined in the operation 212. As will be seen with FIG. 3, the function f( ) and the summation variable f(t,k) make it possible to define a weighting function that varies according to the control points, which is continuous, which converges to infinity, and which is equal to 1 at each control point considered.

The first loop ends in an operation 216 in which the index i is compared with the number of control points I. If there are control points that remain to be scanned, then the index i is incremented in an operation 218 and the first loop resumes with the operation 206. Otherwise, the first loop ends and the second current loop ends with the calculation of the displacement of the point X(t,k) by a function Mv(t,k) in an operation 220.

FIG. 3 represents an example of implementation of the function Mv(t,k).

When all the control points have been scanned, for a second loop of given index k the following are accordingly obtained:
- a plurality of control point displacement vectors U(t,i),
- a plurality of coefficients related to the gradient of these vectors gu(t,i),
- a plurality of coefficients f(t,k,i) related to the distance between the current point Y(t,k) and each control point X(t,i), and
- a variable f(t,k) that contains the sum of all the coefficients f(t,k,i).

All these elements will make it possible to calculate the displacement of a point of the three-dimensional surface data between an instant t−1 and an instant t.

For this, in an operation 300, the point of index k at instant t, i.e. Y(t,k) is defined with the coordinates of this same point at instant t−1, i.e. of the coordinate data of the point Y(t−1,k).

Then, a loop will scan all the control points for adding each displacement vector. For this, the index i is initialized to 0 in an operation 310.

In each iteration of the loop, a displacement vector related to the current control point of index i is calculated. This displacement vector corresponds to the sum of the displacement vector of the control point U(t,i) and a vector that corresponds to the difference between the point Y(t−1,k) and the current control point X(t−1,i).

Thus, in an operation 320, the vector V(t,k,i) that corresponds to the difference between the point Y(t−1,k) and the current control point X(t−1,i) is calculated by difference of the respective coordinate data of these points.

Then, in an operation 330, the vector U(t,i) and the vector V(t,k,i) multiplied by the scalar gu(t,i) are added together to define an unweighted displacement vector W(t,k,i) associated with the control point of index i.

In an operation 340, the unweighted displacement vector W(t,k,i) is weighted by a value corresponding to the ratio between the coefficient f(t,k,i) relating the control point of index i and the three-dimensional surface data point of index k, and the summation variable f(t,k) that contains the sum of the coefficients f(t,k,i).

Finally, in an operation 350, the function Mv(t,k) determines whether all the indices i have been scanned. If there are control points that remain to be scanned, then the index i is incremented in an operation 360 and the loop resumes in the operation 320. Otherwise the function Mv( ) ends in an operation 370 with the storage of the new point Y(t,k) the coordinate data of which have just been calculated.

Thus, for each index i, the operation 340 displaces the point Y(t,k) by a displacement vector related to the control point of index i which presents the following formula:

$$\frac{f(t, k, i)}{\Sigma_j f(t, k, j)} \overrightarrow{(U(t, i)} + gu(t, i) * \overrightarrow{Y(t-1, k)X(t-1, i))}$$

For simplicity, the weighting function may be defined related to the control point:

$$w(t, i, k) = \frac{f(t, k, i)}{\Sigma_j f(t, k, j)}$$

When all the control points have been scanned, then:

$$\overrightarrow{Y(t, k)Y(t-1, k)} = \sum_i w(t, i) \overrightarrow{(U(t, i)} + gu(t, i) * \overrightarrow{Y(t-1, k)X(t-1, i))}$$

Now, let Z( ) be the displacement field of the points Y. This displacement field of index k between instants t−1 and t may be rewritten as the weighted sum of the displacements of the control points X(t−1,i):

$$\overrightarrow{Z(Y, t-1, t, k)} = \sum_i z(t, i, k) Z(X(t-1, i) + (Y((t-1, k) - X(t-1, i)))$$

where z(t,i,k) form a plurality of weighting functions such that z(Y,t,i) equals 1 if Y is the control point X(t−1,i), and such that for any point Y, $\Sigma_i z(Y,t,i)=1$ By creating a limited expansion around each control point X(t−1,i) this gives:

$$\overrightarrow{Z(Y, t-1, t, k)} = \sum_i z(Y, t, i) \overrightarrow{(Z(X, t-1, t, i)} +$$

$$\overrightarrow{Grad(Z(X, t-1, t, i)} * \overrightarrow{Y(t-1, k)X(t-1, i)} +$$

$$o(\|Y(t-1, k)X(t-1, i)\|))$$

That is:

$$\overrightarrow{Y(t, k)Y(t-1, k)} =$$

$$\sum_i z(t, i) \overrightarrow{(X(t, i) - X(t-1, i)} + gu(t, i) * \overrightarrow{Y(t-1, k)X(t-1, i)} +$$

$$o(\|Y(t-1, k)X(t-1, i)\|)$$

Now, by using the definition of the function f( ), a correspondence is obtained between the weighting w(t,i,k) and the functions z(Y,t,i).

The point Y(t,k) calculated by the function Mv( ) therefore corresponds well to the displacement of the point Y(t−1,k) in the vicinity of the control points for which the displacement is known.

The first variant of the function f( ) amounts to neglecting the term $o(\|Y(t-1,k)X(t-1,i)\|$.

The second variant of the function f( ) makes it possible to take into account the term $o(\|Y(t-1,k)X(t-1,i)\|$, and can be written as follows when all the control points have been scanned:

$$\overrightarrow{Y(t,k)Y(t-1,k)} = \sum_i w(t,i) \left( \overrightarrow{U(t,i)} + \frac{Grad(U(t,i)) * \overrightarrow{Y(t-1,k)X(t-1,i)}}{1 + \|\overrightarrow{Y(t-1,k)X(t-1,i)}\|^\alpha / R^\alpha} \right)$$

where α is a real coefficient greater than 1 and R is a distance characterizing the resistance to deformation of the three-dimensional surface.

Once the function Mv( ) has finished, the second loop ends in a test on the index k in an operation 222. If there are three-dimensional surface data points that remain to be scanned, then the index k is incremented in an operation 224, and the second loop resumes with the setting to 0 of the summation variable f(t,k) in the operation 205 and the execution of the first loop for the new index k.

If all the three-dimensional surface data points have been scanned, then a function Anim( ) is executed in an operation 228. The function Anim( ) will generate the animation of the three-dimensional surface defined by the points Y between instants t−1 and t. This animation may be achieved in various ways. In the example described here, for one second of sound data, the memory 2 contains 250 sound data and 250 associated control data sets. The function Anim( ) therefore consists in successively displaying the calculated images.

According to a first variant, several intermediate positions are calculated by interpolation for each point Y between instants t−1 and t according to the duration of the associated sound data and the coordinate data of each point Y at instants t−1 and t. The processor provides the display of the interpolated images in synchronization with the reproduction of the corresponding sound data. According to other variants, other interpolation methods may be used such as a linear interpolation or a spline-based interpolation. The choice of interpolation method will depend notably on the type of surface to be animated and the animation considered. In yet another variant, e.g. when the successive sound data represent very close instants, no interpolation is performed, and the procedure simply passes from the three-dimensional surface data at instant t−1 to the three-dimensional surface data at instant t.

Then, in an operation 230, the processor 4 determines whether all the sound data have been scanned, and therefore whether the third loop has finished. If this is not the case, the index t is incremented in an operation 232 and the third loop starts again with the initialization of a second loop with the operation 204. Otherwise, the animation ends in an operation 234.

The three-dimensional surface data are therefore calculated and animated gradually, and in synchronization with the sound data via the control data which represent a reduced number of three-dimensional surface points for each of the sound data. Thus, on the basis of a reduced number of control points (21 in the example described here), it becomes possible to animate a surface, e.g. the face of a character, in a realistic way, even with a very high display resolution (for a face, 8 000 points in the example described here), and with a realistic cost in calculation and storage. Thus, the ratio of the number of three-dimensional surface points over the number of control points may be greater than 50, 150, or even greater than 300.

As mentioned above, these data may be data which make it possible to associate the animation which is produced with a corresponding set of sounds. More generally, the sound data can be seen as data which organize the animation of the three-dimensional surface over time.

The invention claimed is:

1. An image processing device configured to generate sound-synchronized animations for a three-dimensional surface, the image processing device comprising:
   a memory storing sound data, three-dimensional surface data, and a plurality of control data sets, each control data set representing a plurality of control points defined by coordinate data and being associated with the sound data, and
   a processor arranged, on the basis of first and second sound data, and on the basis of first three-dimensional surface data, for selecting respective control data sets associated with the first and second sound data, and for defining second three-dimensional surface data by applying a displacement to each point of the first three-dimensional surface data,
   the displacement of a given point of the first three-dimensional surface data being calculated by the processor as a sum of displacement vectors calculated for each control point of the respective control data set associated with the first sound data,
   each displacement vector calculated for a given control point being calculated by the processor on the basis of a sum of a first vector and a second vector, which sum is weighted by a weight calculated as a ratio between a result of a two variable function having a zero limit at infinity applied to the given point of the first three-dimensional surface data and to the given control point and a sum of the result of the two variable function applied to the given point of the first three-dimensional surface data on the one hand and to each of the control points of the respective control data set associated with the first sound data on the other hand,
   the first vector representing a displacement of a position defined by coordinate data of the given control point in the respective control data set associated with the first sound data to a position defined by coordinate data of the given control point in the respective control data set associated with the second sound data,
   the second vector corresponding to a difference between coordinate data of the given point of the first three-dimensional surface data and coordinate data of the given control point in the respective control data set associated with the first sound data, multiplied by a coefficient dependent on a gradient of the first vector; and
   the processor arranged to animate the three-dimensional surface based on the first three-dimensional surface data and the second three-dimensional surface data and synchronize the animation with the first sound data and the second sound data based on the respective control data sets for the first and second sound data.

2. The device as claimed in claim 1, in which the two variable function is based on a mathematical distance between the given point of the first three-dimensional surface data and the given control point, wherein the mathematical distance is raised to a preselected power.

3. The device as claimed in claim 2, in which the mathematical distance is chosen from a group comprising a Euclidean distance, a quadratic distance and a geodesic distance.

4. The device as claimed in claim 2, in which the preselected power is less than or equal to −1.

5. The device as claimed in claim 1, in which the coefficient dependent on the gradient of the first vector is equal to the gradient of the first vector.

6. The device as claimed in claim 1, in which a coefficient dependent on the gradient of the first vector is equal to the gradient of the first vector divided by a value proportional to a distance between the given point of the first three-dimensional surface data and the given control point.

7. The device as claimed in claim 6, in which the proportional value corresponds to a ratio of the distance between the given point of the first three-dimensional surface data and the given control point by a deformation constant greater than 1, this ratio being raised to a chosen power plus one.

8. The device as claimed in claim 7, in which the chosen power is greater than or equal to 1.

9. The device as claimed in claim 1, in which a ratio between a number of three-dimensional surface data points and a number of points in a control data set is greater than 50.

10. A computer program product embodied on a non-transitory computer readable medium and executable by the processor to implement the device as claimed in claim 1.

* * * * *